US007705083B2

(12) United States Patent  (10) Patent No.: US 7,705,083 B2
Stanga et al.  (45) Date of Patent: *Apr. 27, 2010

(54) CURABLE FLUOROELASTOMERS

(75) Inventors: Milena Stanga, Cremona (IT);
Margherita Albano, Milan (IT);
Vincenzo Arcella, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/114,098

(22) Filed: Apr. 26, 2005

(65) Prior Publication Data

US 2005/0245691 A1 Nov. 3, 2005

(30) Foreign Application Priority Data

Apr. 27, 2004 (IT) .......................... MI2004A0830

(51) Int. Cl.
C08F 8/30 (2006.01)
C09K 3/00 (2006.01)
C08F 8/00 (2006.01)
C08F 214/18 (2006.01)
C08F 8/08 (2006.01)

(52) U.S. Cl. ...................... 524/430; 524/543; 524/545; 525/326.3; 525/331.1; 252/182.14; 252/182.15; 252/182.17; 252/182.24

(58) Field of Classification Search ................. 524/430, 524/543, 545; 525/331.1, 326.3; 252/182.14, 252/182.15
See application file for complete search history.

(56) References Cited

U.S. PATENT DOCUMENTS

| 3,655,727 A | 4/1972 | Patel et al. |
| 3,686,143 A | 8/1972 | Bowman |
| 3,712,877 A | 1/1973 | Patel et al. |
| 3,752,787 A | 8/1973 | De Brunner |
| 3,810,874 A | 5/1974 | Mitsch et al. |
| 3,857,807 A | 12/1974 | Kometani et al. |
| 3,876,654 A | 4/1975 | Pattison |
| 3,933,732 A | 1/1976 | Schmiegel |
| 4,233,421 A | 11/1980 | Worm |
| 4,233,427 A | 11/1980 | Bargain et al. |
| 4,259,463 A | 3/1981 | Moggi et al. |
| 4,287,320 A | 9/1981 | Kolb |
| 4,524,197 A | 6/1985 | Khan |
| 4,789,717 A | 12/1988 | Giannetti et al. |
| 4,810,760 A | 3/1989 | Strepparola et al. |
| 4,864,006 A | 9/1989 | Giannetti et al. |
| 4,882,390 A | 11/1989 | Kolb |
| 4,894,418 A | 1/1990 | Strepparola et al. |
| 4,912,171 A | 3/1990 | Grootaert et al. |
| 5,591,804 A | 1/1997 | Coggio et al. |
| 5,648,429 A * | 7/1997 | Chiodini et al. ............. 525/340 |
| 5,728,773 A | 3/1998 | Jing et al. |
| 5,830,381 A * | 11/1998 | Chiodini et al. ........ 252/182.14 |
| 5,929,169 A | 7/1999 | Jing et al. |
| 6,020,440 A * | 2/2000 | Tabb ........................... 525/379 |
| 6,277,937 B1 * | 8/2001 | Duvalsaint et al. .......... 526/255 |
| 6,664,338 B2 * | 12/2003 | Staccione et al. ........ 525/326.3 |
| 6,710,132 B2 * | 3/2004 | Apostolo et al. ............ 525/199 |
| 6,921,796 B2 * | 7/2005 | Hetherington ........... 525/326.3 |
| 2003/0236370 A1 * | 12/2003 | Grootaert et al. ............ 526/253 |

FOREIGN PATENT DOCUMENTS

| EP | 0 120 462 A1 | 10/1984 |
| EP | 0 127 318 A1 | 12/1984 |
| EP | 0 182 299 A2 | 5/1986 |
| EP | 0 196 904 A2 | 10/1986 |
| EP | 0 280 312 A2 | 8/1988 |
| EP | 0 335 705 A1 | 10/1989 |
| EP | 0 360 292 A2 | 3/1990 |
| EP | 0 407 937 A1 | 1/1991 |
| EP | 0 571 807 A1 | 12/1993 |
| EP | 0 574 319 A1 | 12/1993 |
| EP | 0 625 526 B1 | 11/1994 |
| EP | 0 661 304 B1 | 7/1995 |
| EP | 0 684 276 A1 | 11/1995 |
| EP | 0 684 277 A1 | 11/1995 |
| EP | 1 347 012 A2 | 9/2003 |
| IT | 0661304 A1 * | 12/1994 |
| IT | 0661304 A1 * | 5/1995 |
| IT | 661304 A1 * | 5/1995 |
| IT | 661304 * | 7/1995 |

OTHER PUBLICATIONS

"Principles of Polymerization", George Odian, $4^{th}$ Ed. p. 367.*
Knunyants et al., "Fluorinated Diiodoalkanes and Diolefins", Izv. Akad Nauk., SSSR, Ser. Khim., pp. 384-386 (1964).
West et al., "Fluorinated Elastomers", Encyclopedia of Chemical Technology, vol. 8, $3^{rd}$ Ed., pp. 500-515 (1979).
Pianca et al., "End Groups in Fluoropolymers", J. Fluorine Chem., 95, pp. 71-84 (1999).

* cited by examiner

*Primary Examiner*—Duane Smith
*Assistant Examiner*—Ives Wu
(74) *Attorney, Agent, or Firm*—Arent Fox LLP

(57) ABSTRACT

Ionically curable fluoroelastomers based on vinylidenfluoride (VDF) comprising:
a) 100 parts by weight of fluoroelastomer based on vinylidenfluoride (VDF) substantially polar end groups free;
b) from 0.1 to 0.35 phr of accelerating agent;
c) from 1 to 15 phr of curing agent;
d) from 2 to 20 phr of one or more inorganic acid acceptors, preferably bivalent metal oxides;
e) from 0 to 3 phr, preferably from 0 to 1.5 phr of one or more basic compounds preferably hydroxides of bivalent metals or of weak acid metal salts;
f) from 0 to 80 phr of reinforcing fillers;
g) from 0 to 3 phr of coadjuvants of processability.

37 Claims, No Drawings

CURABLE FLUOROELASTOMERS

The present invention relates to curable fluoroelastomers, capable to give cured fluoroelastomers having improved sealing properties, meant as improved compression set on O-ring.

More specifically the invention curable fluoroelastomers are ionically cured. The cured fluoroelastomers of the present invention are used in the preparation of O-rings, gaskets, shaft seals, fuel hoses, etc. The O-rings obtained with the invention curable compositions show an improved compression set value, combined with good mechanical properties. The curable fluoroelastomers of the present invention have extremely low compression set values, lower than 20% already after crosslinking in press at 190° C.-200° C. for 5-10 minutes, without the need of post-treatment in stove at 250° C. If one wishes to obtain still improved compression set values, values lower than 12%, very short post-treatment times at 250° C. are sufficient, generally lower than 1 hour, more preferably lower than 30 minutes.

It is well known that one of the most important fluoroelastomer applications regards the O-ring preparation. These are obtained from fluoroelastomeric copolymers containing units deriving from vinylidenfluoride (VDF), hexafluoropropene (HFP), optionally tetrafluoroethylene (TFE).

The polymers used in this application must have high elastomeric characteristics at low and high temperatures and must show a good processability, so to be easily molded by injection with automatic cycles, or by compression molding, in technologically acceptable times, without excessive material wastes.

The need was felt to have available VDF-based curable fluoroelastomers to prepare the above mentioned manufactured articles having an improved compression set combined with good mechanical properties.

An object of the present invention are ionically curable vinylidenfluoride (VDF) containing fluoroelastomers comprising:

a) 100 parts by weight of vinylidenfluoride (VDF) based fluoroelastomer substantially polar end groups free;
b) from 0.1 to 0.35 phr, preferably from 0.1 to 0.3 phr, more preferably from 0.1 to 0.15 phr of accelerating agent;
c) from 1 to 15 phr, preferably from 1 to 10 phr, more preferably from 1 to 5 phr of a curing agent;
d) from 2 to 20 phr, preferably from 2 to 10 phr, more preferably from 3 to 7 phr of one or more inorganic acid acceptors, preferably bivalent metal oxides;
e) from 0 to 3 phr, preferably from 0 to 2 phr, still more preferably from 0.5 to 1 phr of one or more basic compounds preferably hydroxides of bivalent metals or of weak acid metal salts;
f) from 0 to 80 phr, preferably 20-60 phr of fillers;
g) from 0 to 3 phr, preferably from 0.5 to 2 phr, still more preferably from 0.5 to 1 phr of coadjuvants of processability.

The fluoroelastomers component a) comprise VFD copolymers containing at least another ethylenically unsaturated fluorinated comonomer. The last can be selected for example from the following:

$C_2$-$C_8$ perfluoroolefins, as hexafluoropropene (HFP), tetrafluoroethylene (TFE);

$C_2$-$C_8$ fluoroolefins containing hydrogen and/or chlorine and/or bromine and/or iodine, as trifluoroethylene, pentafluoropropene, chlorotrifluoroethylene (CTFE), bromotrifluoroethylene;

fluorovinylethers (VE) preferably selected from:

$CF_2$=$CFOR_f$ (per)fluoroalkylvinylethers (PAVE), wherein $R_f$ is a $C_1$-$C_6$ (per)fluoroalkyl, for example trifluoromethyl, bromodifluoromethyl, pentafluoropropyl;

$CF_2$=CFOX perfluoro-oxyalkylvinylethers, wherein X is a $C_1$-$C_{12}$ perfluoro-oxyalkyl having one or more ether groups, for example perfluoro-2-propoxy-propyl;

$CF_2$=$CFOCF_2OCF_2CF_3$ (A-III) and $CF_2$=$CFOCF_2OCF_2CF_2OCF_3$ (A-IV).

The fluoroelastomers object of the present invention can also contain units deriving from non fluorinated ethylenically unsaturated monomers, in particular $C_2$-$C_8$ non fluorinated olefins (Ol) as ethylene and propylene.

In the polymer also small amounts between 0.01 and 5% by moles of units deriving from a fluorinated bis-olefin can be present. The bis-olefins described in the European patent EP 661,304, herein incorporated by reference, can for example be used. The preferred bis-olefins have general formula:

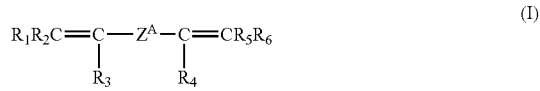

$$R_1R_2C=C-Z^A-C=CR_5R_6 \quad \text{(I)}$$
$$\qquad\quad | \qquad\quad |$$
$$\qquad\quad R_3 \qquad R_4$$

wherein:
$R_1$, $R_2$, $R_3$, $R_4$, $R_5$, $R_6$, equal to or different from each other, are H or $C_1$-$C_5$ alkyls;

$Z^A$ is a $C_1$-$C_{18}$, linear or branched, alkylene or cycloalkylene radical, optionally containing oxygen atoms, preferably at least partially fluorinated, or a (per)fluoropolyoxyalkylene radical.

In the formula (I), $Z^A$ is preferably a $C_4$-$C_{12}$, more preferably $C_4$-$C_8$ perfluoroalkylene radical, while $R_1$, $R_2$, $R_3$, $R_4$, $R_5$, $R_6$ are preferably hydrogen.

When $Z^A$ is a (per)fluoropolyoxyalkylene radical, it can comprise units selected from the following:

—$CF_2CF_2O$—, —$CF_2CF(CF_3)O$—, —$CFX_1O$— wherein $X_1$=F, $CF_3$, —$CF_2CF_2CF_2O$—, —$CF_2CH_2CH_2O$—, —$C_3F_6O$—.

Preferably $Z^A$ has formula:

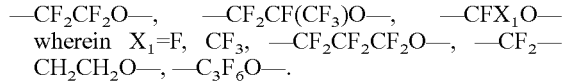

$$\text{-}(Q^A)_p\text{-}CF_2O\text{---}(CF_2CF_2O)_m(CF_2O)_n\text{---}CF_2\text{-}(Q^A)_p\text{-} \quad \text{(II)}$$

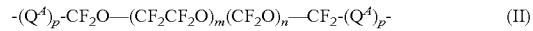

wherein: $Q^A$ is a $C_1$-$C_{10}$ alkylene or oxyalkylene radical; p is 0 or 1; m and n are numbers such that the m/n ratio is between 0.2 and 5 and the number average molecular weight of said (per)fluoropolyoxyalkylene radical is in the range 300-10,000, preferably 700-2,000.

The bis-olefins of formula (I) wherein $Z^A$ is an alkylene or cycloalkylene radical can be prepared according to what described, for example, by I. L. Knunyants et al in Izv. Akad. Nauk. SSSR, Ser. Khim., 1964(2), 384-6, while the bis-olefins containing (per)fluoropolyoxyalkylene sequences are described in the U.S. Pat. No. 3,810,874.

Preferred compositions of the fluoroelastomers component a) are the following (% by moles):

VDF 45-85%, HFP 15-45%, TFE 0-30%;
VDF 20-30%, HFP 15-40%, TFE 0-30%, Ol 5-30%, PAVE 0-35%;
VDF 60-75%, HFP 10-25%, VE 0-15%, TFE 0-20%.

The fluoroelastomers component a) as said are substantially polar end groups free. With end groups are meant all the groups present at the ends of the polymeric chain or of the branchings, if present, with polar groups are meant groups of ionic type, as carboxylate —COO⁻ and sulphate —OSO₃⁻ groups and of non ionic type, as alcohol groups —CH$_2$OH, acylfluoride —COF, amidic —CONH$_2$, and the like. With the wording "substantially polar groups free" it is meant that the amount of polar end groups is lower than 3% by moles, preferably lower than 1% by moles with respect to the total amount of the polymer end groups present, still more preferably it is zero. It is said that the amount of polar groups is zero when the amount of all the types of polar end groups present is lower than the detectability limit according to the method reported in the Examples, i.e. lower than 0.1 mmole/Kg of polymer.

The usable accelerating agent component b) is constituted by an -onium organic derivative. The -onium organic derivatives usable for the invention generally contain at least one heteroatom, for example, N, P, S, O linked to organic or inorganic groups. The -onium organic compounds suitable to be used in the invention are, for example, those described in the patents U.S. Pat. Nos. 3,655,727, 3,712,877, 3,857,807, 3,686,143, 3,933,732, 3,876,654, 4,233,421, 4,259,463, 4,882,390, 4,912,171, 5,591,804, EP 182,299, EP 120,462; West and Holcomb, "Fluorinated Elastomers", Kirk-Othmer; Encyclopedia of Chemical Technology, vol. 8, 3rd Ed. John Wiley & Sons, Inc., pages 500-515 (1979).

The -onium organic compounds which can be used belong, for example, to the following classes:

A) compounds having general formula:

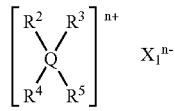
(I)

wherein:

Q has the following meanings: nitrogen, phosphor, arsenic, antimony, sulphur;

X$_I$ is an organic or inorganic anion such as, for example, halide, sulphate, acetate, phosphate, phosphonate, hydroxide, alkoxide, phenate, bisphenate;

n is the valence of the X$_I$ ion;

R$^2$, R$^3$, R$^4$ R$^5$, independently the one from the other, have the following meanings:
C$_1$-C$_{20}$ alkyl, C$_6$-C$_{20}$ aryl or arylalkyl, C$_1$-C$_{20}$ alkenyls, or a combination thereof;
halogen, selected from chlorine, fluorine, bromine;
or cyano groups, —OR$_B$ and COOR$_B$, wherein R$_B$ is an alkyl, aryl, arylalkyl or alkenyl having the above meanings;
wherein two radicals of the group R$^2$, R$^3$, R$^4$ R$^5$ can form with the heteroatom Q a cyclic structure;
when Q is a sulphur atom one of the radicals R$^2$, R$^3$, R$^4$, R$^5$ is not present;

B) amino-phosphonium derivatives having the following general formulas:

(II)

(III)

wherein:

R$^6$, R$^7$ and R$^8$, equal or different, have the following meanings:
C$_1$-C$_{18}$, preferably C$_1$-C$_{12}$, alkyl, C$_4$-C$_7$ cycloalkyl, C$_6$-C$_{18}$, preferably C$_6$-C$_{12}$, aryl or arylalkyl;
oxyalkyl or poly(oxyalkyl) wherein the alkyl is as above defined and the polyoxyalkyl radical has a free or etherified terminal OH function;
R$^6$, R$^7$ and R$^8$ can optionally contain halogens, CN, OH, carbalkoxy groups;
wherein R$^6$ and R$^7$ can form with the nitrogen atom an heterocyclic ring;
R$^9$ is an alkylene, C$_1$-C$_6$ oxyalkylene or C$_6$-C$_{12}$ arylene bivalent radical;
nI is an integer from 1 to 4;
r is an integer from 1 to 3;
mI is an integer from 1 to 2 and corresponds to the Y ion valence;
p is a coefficient such that mI×p=2;
Y is an anion having valence m and can be organic or inorganic; for example Y can be selected from halides, perchlorate, nitrate, tetrafluoborate, hexafluorophosphate, oxalate, acetate, stearate, haloacetate, para-toluensulphonate, phenate, bisphenate, hydroxide; Y can also be a complex anion, for example, ZnCl$_4^{2-}$, CdCl$_4^{2-}$, NiBr$_4^{2-}$, HgI$_3^{31}$;

C) phosphoranes, in particular triarylphosphoranes, having formula:

(IV)

wherein:

Ar is phenyl, substituted phenyl (as, for example, methoxyphenyl, chlorophenyl, tolyl), naphthyl;
R$^{10}$ is hydrogen, methyl, ethyl, propyl, carbalkoxy;
R$^{11}$ is carbalkoxy, C$_1$-C$_8$ alkyls, cyano, and amidic;
or R$^{10}$ with R$^{11}$ with the carbon atom of the P=C bond forms a cyclic group, for example cyclopentadiene;

D) Iminium salts having formula

(V)

wherein:

R$^{12}$ is a monovalent organic radical ended with one heteroatom, as P, S, O or N, such that the organic radical is covalently linked to the nitrogen atom through said heteroatom;

c is the X$_c$ anion valence;

X$_c$ is an organic or inorganic anion, for example halide, hydroxide, sulphate, thiosulphate, nitrate, formate, acetate, cyanate, thiocyanate, tetraphenylborate, phosphate, phosphonate, alkoxide, phenate, bisphenate or perchlorate.

Examples of the -onium-organic derivatives of class A) are the following: triphenylbenzylphosphonium chloride, tetraphenylphosphonium chloride, tetrabutylammonium chloride, tetrabutylammonium bisulphate, tetrabutylammonium bromide, tributylallylphosphonium chloride, tributylbenzylphosphonium chloride, dibutyldiphenylphosphonium chloride, tetrabutylphosphonium chloride, triarylsulphonium chloride.

Examples of amino-phosphonium derivatives of class B) are benzyldiphenyl(diethylamino)phosphonium and benzyltris (dimethylamino) phosphonium salts.

An example of the compounds of class D) is 8-benzyl-1, 8-diazobicyclo[5,4,0]-7-undecene chloride.

Preferably quaternary ammonium or phosphonium salts are used, see for example EP 335,705 and U.S. Pat. No. 3,876,654; the amino-phosphonium salts, see for example U.S. Pat. No. 4,259,463; phosphoranes, see for example U.S. Pat. No. 3,752,787.

Mixtures of -onium-organic derivatives can also be used.

As component c) curing agent, polyhydroxylated, aromatic or aliphatic compounds or their derivatives can be used, as described, for example, in EP 335,705 and U.S. Pat. No. 4,233,427. For example di- tri- and tetrahydroxybenzenes, naphthalenes, anthracenes and bisphenols of formula

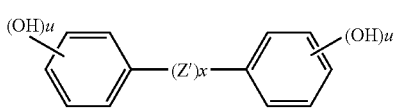

(VI)

can be mentioned, wherein:

Z' has one of the following meanings:
  $C_1$-$C_{13}$ linear or branched aliphatic bivalent radical, $C_4$-$C_{13}$ cycloaliphatic, $C_6$-$C_{13}$ aromatic or arylalkylene, optionally substituted with at least one chlorine or fluorine atom;
  a thio, oxy, carbonyl, sulphinyl or sulphonyl radical;
  x is 0 or 1;
  u is 1 or 2;
  the aromatic rings of the compound of formula (VI) can optionally have other substituents selected from chlorine, fluorine or bromine; —CHO, $C_1$-$C_8$ alkoxy, —COOR$_{10}$, wherein R$_{10}$ is H or $C_1$-$C_8$ alkyl, $C_6$-$C_{14}$ aryl, $C_4$-$C_{12}$ cycloalkyl.

When in formula (VI) Z' is alkylene, it can, for example, be methylene, ethylene, chloroethylene, fluoroethylene, difluoro ethylene, 1,3-propylene, tetramethylene, chlorotetramethylene, fluorotetramethylene, trifluorotetramethylene, 2-methyl-1,3-propylene, 2-methyl-1,2-propylene, pentamethylene, hexamethylene. When Z' is an alkylidene it can, for example, be ethylidene, dichloroethylidene, difluoroethylidene, propylidene, isopropylidene, trifluoroisopropylidene, hexafluoro isopropylidene, butylidene, heptachlorobutylidene, heptafluoro butylidene, pentylidene, hexylidene, 1,1-cyclohexylidene.

When Z' is a cycloalkylene, it can, for example, be 1,4-cyclohexylene, 2-chloro-1,4-cyclohexylene, 2-fluoro-1,4-cyclo hexylene, 1,3-cyclohexylene, cyclopentylene, chlorocyclo pentylene, fluorocyclopentylene, and cycloheptylene. Besides Z' can be an arylene radical, as m-phenylene, p-phenylene, 2-chloro-1,4-phenylene, 2-fluoro-1,4-phenylene, o-phenylene, methyl phenylene, dimethylphenylene, trimethyl-phenylene, tetramethyl phenylene, 1,4-naphthylene, 3-fluoro-1,4-naphthylene, 5-chloro-1,4-naphthylene, 1,5-naphthylene and 2,6-naphthylene.

Among the curing agents of formula (VI), hexafluoroisopropylidene bis (4-hydroxybenzene), known as bisphenol AF, 4,4'-dihydroxydiphenyl sulphone and isopropylidene bis (4-hydroxybenzene), known as bisphenol A, are preferred.

Other polyhydroxyl compounds usable as curing agents are, for example, dihydroxybenzenes as catechol, resorcinol, 2-methyl resorcinol, 5-methyl resorcinol, hydroquinone, 2-methyl hydroquinone, 2,5-dimethyl hydroquinone, 2-t-butyl hydroquinone, 1,5-dihydroxynaphthalene.

Other curing agents based on polyols are the salts formed by the anion of a bisphenol with alkaline metal cations, as, for example, the bisphenol AF dipotassium salt and the monosodium monopotassium salt of the bisphenol AF.

As curing agents, the -onium biphenates can also be used, i.e. the salts of a bisphenol wherein one or both hydroxyls are in the form of -onium salts. As counterions of the bisphenate, all the cations corresponding to the above described -onion organic derivatives accelerating agents component b) can be used.

Other curing agents are, for example, described in EP 335,705 and U.S. Pat. No. 4,233,427.

In curable fluoroelastomers instead of component b) and c) an adduct of component b) with component c) is used. Preferably in molar ratios curing agent:accelerating agent from 1:1 to 5:1, preferably from 2:1 to 5:1. In particular an adduct constituted by bisphenol and an -onium salt is used.

These compounds are obtained by melting of the reaction product between the accelerating agent and the curing agent in the indicated molar ratios, or by melting of the adduct mixture 1:1 additived with the curing agent in the indicated amounts.

Optionally, when the adduct is used, also a small amount of free accelerating agent can be present in addition to that contained in the adduct.

Optionally, preferably, when the adduct is used, an amount of free curing agent can be present in addition to that contained in the adduct.

For the preparation of the adduct the following are particularly preferred as cations: 1,1-diphenyl-1-benzyl-N-diethylphosphoranamine, tetrabutyl phosphonium, tetrabutyl ammonium; among anions the bisphenol compounds are particularly preferred, wherein the two aromatic rings are linked by an alkylene group selected from the perfluoroalkylene groups from 3 to 7 carbon atoms, and the OH in the aromatic rings are in para position.

The adduct preparation is described in the European patent applications in the name of the Applicant EP 684,277, EP 684,276 herein incorporated by reference.

Other compounds usable as curing agents are the following:
fluoroethers and difunctional fluoropolyethers selected from the following:
HOCH$_2$—CF$_2$OCF$_2$CF$_2$OCF$_2$—CH$_2$OH
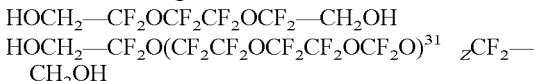
HOCH$_2$—CF$_2$CF$_2$OCF$_2$CF$_2$—CH$_2$OH
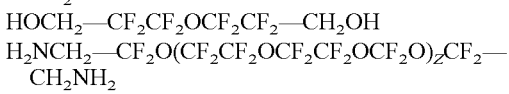
wherein Z is an integer from 1 to 15.

These compounds are described in patents U.S. Pat. Nos. 4,810,760 and 4,894,418.

It is also possible to use salts of the aforesaid difunctional fluoropolyethers, showing the advantage to be more easily incorporated in the fluoroelastomer. In said salts, at least one of the two end groups is a metal alcoholate, preferably a bivalent metal, or it is an ammonium salt when the starting end groups are amines.

Examples of end groups of the first type are —CH$_2$OM$_g$OH, —CH$_2$OC$_a$OH, —CH$_2$OznOH; an end group of the second type is, for example, —CH$_2$NH$_3^{+Cl3 1}$.

Polyols wherein one or more hydroxy groups are blocked as esters or carbonates.

This class of compounds comprises polyhydroxylated compounds, in particular polyphenols and the above difunctional fluoro polyethers, wherein at least one of the hydroxyl groups is substituted by an ester or carbonate group. Said compounds are described in U.S. Pat. Nos. 5,728,773 and 5,929,169.

Polyols wherein one or more hydroxyl groups are blocked or protected in the form of silylethers.

This class of compounds comprises polyhydroxylated compounds, in particular polyphenols and the above difunctional fluoropolyethers, wherein at least one of the hydroxyl groups is substituted by one —OsiR$^k_3$ group wherein R$^k$ is a radical having a C$_1$-C$_{20}$ linear or branched aliphatic structure, C$_3$-C$_{20}$ cycloaliphatic or C$_6$-C$_{20}$ aromatic structure containing hydrogen and/or fluorine. 4,4'-hexafluoroiso-propyliden-bis-(trimethyl silyldiphenol) is preferred. This class of compounds is described in EP 879,851.

Component d) is selected from those used in the ionic curing of vinylidene fluoride copolymers. ZnO, MgO, PbO can be mentioned.

Component e) is selected from those known in the ionic curing of vinylidene fluoride copolymers. Hydroxides can, for example, be mentioned. They are preferably selected for example among Ca(OH)$_2$, Sr(OH)$_2$, Ba(OH)$_2$. Other examples of component e) are the metal salts of weak acids, as, for examples, Ca, Sr, Ba, Na and K carbonates, benzoates, oxalates and phosphites. Mixtures of said hydroxides with the aforesaid metal salts can also be used.

Component f) is preferably selected from the following: carbon black, barium sulphate, silica, silicates, semicrystalline fluoropolymers. The semicrystalline fluoropolymers have sizes from 5 to 90 nm, preferably from 10 to 60. With semicrystalline fluoropolymer it is meant a fluoropolymer showing, besides the glass transition temperature Tg, at least a crystalline melting temperature. An example of semicrystalline fluoropolymer is that based on modified PTFE. I.e. it comprises at least one comonomer containing at least one ethylene unsaturation of hydrogenated and fluorinated type. Among those hydrogenated, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:
C$_3$-C$_8$ perfluoroolefins, as hexafluoropropene (HFP), hexafluoroisobutene;
C$_2$-C$_8$ hydrogenated fluorolefins, as vinyl fluoride (VF), vinylidene fluoride (VDF), trifluoroethylene, CH$_2$=CH—R$_f$ perfluoroalkylethylene, wherein R$_f$ is a C$_1$-C$_6$ perfluoroalkyl;
C$_2$-C$_8$ chloro-fluoroolefins, as chlorotrifluoroethylene (CTFE);
CF$_2$=CFOR$_f$(per)fluoroalkylvinylethers (PAVE) wherein R$_f$ is a C$_1$-C$_6$ (per)fluoroalkyl, for example CF$_3$, C$_2$F$_5$, C$_3$F$_7$;
CF$_2$=CFOX (per)fluoro-oxyalkylvinylethers, wherein X is: a C$_1$-C$_{12}$ alkyl or a C$_1$-C$_{12}$ oxyalkyl, or a C$_1$-C$_{12}$ (per)fluorooxyalkyl having one or more ether groups, for example perfluoro-2-propoxy-propyl; fluorodioxoles, preferably perfluorodioxoles;
fluorovinylethers of general formula CFX$_{AI}$=CX$_{AI}$OCF$_2$OR$_{AI}$ (A-I) wherein R$_{AI}$ is a C$_2$-C$_6$ linear, branched or C$_5$-C$_6$ cyclic (per)fluoroalkyl group, or a C$_2$-C$_6$ linear, branched (per)fluorooxyalkyl group containing from one to three oxygen atoms; when R$_{AI}$ is fluoroalkyl or fluorooxyalkyl as above defined it can contain from 1 to 2 atoms, equal or different, selected from the following: H, Cl, Br, I; X$_{AI}$=F, H; the compounds of general formula: CFX$_{AI}$=CX$_{AI}$OCF$_2$OCF$_2$CF$_2$Y$_{AI}$ (A-II) are preferred, wherein Y$_{AI}$=F, OCF$_3$; X$_{AI}$ as above defined; in particular CF$_2$=CFOCF$_2$OCF$_2$CF$_3$ (A-III) and CF$_2$=CFOCF$_2$OCF$_2$CF$_2$OCF$_3$ (A-IV).

PAVEs are preferred comonomers, in particular perfluoromethyl-, ethyl-, propylvinylether.

Component g) coadjuvant of processability is selected, for example, from esters and amides of fat acids, long chain aliphatic alcohols, polyethylene having low molecular weight, stearic acid and its inorganic salts, substituted sulphur diorgano oxides.

Preferably as component g) coadjuvant of processability, substituted sulphur diorgano oxides, more preferably sulphones and sulpholanes are used.

Said compounds are capable to increase the blend curing rate. Said compounds are described, for example, in U.S. Pat. No. 4,287,320. The substituted sulphur diorgano oxides preferably contain at least one S atom, one or two oxygen atoms linked only to the sulphur atom, and two organic radicals R' and R" linked to the sulphur atom by carbon-sulphur bonds having general formula:

$$(R')(R'')S(O)_{xA} \qquad (VI)$$

wherein:
xA is 1 or 2;
R' and R", equal or different, are organic radicals containing from one to 20 or more carbon atoms, up to a maximum of 30; preferably from 1 to 8 carbon atoms; R' and R" together can form an only one alkylene group, forming with the sulphur atom an heterocyclic ring; R' and R" being formed by an aliphatic linear, branched or cyclic, or aromatic chain of carbon atoms, R' and R" can optionally contain heteroatoms, for example oxygen, and/or substituents, for example halides, alkoxy, sulphinyl, sulphonyl, carbalkoxy, oxy, hydroxyls, nitro, cyano, alkyls, aryls.

The substituted sulphur diorgano oxides comprise the diorgan sulphoxides and diorgan sulphones and are described for example in "Organic Syntheses", Vol. I, pages 718-725, Vol. II, pages 1709-1715, Reinhold Publishing Co., N.Y., N.Y., 1957. Dimethylsulphone, tetramethylsulphone, and bis(4-chlorophenyl)sulphone are particularly preferred.

To the curing blend other conventional additives, as thickeners, pigments, antioxidants, stabilizers and the like can then be added.

The fluoroelastomers component a) are obtained by radical polymerization. Radical initiators can for example be used, preferably an organic peroxide, selected in particular from:
I) dialkylperoxides, wherein the alkyl has from 1 to 12 carbon atoms, as di-ter-butylperoxide (DTBP);
II) dialkylperoxydicarbonates, wherein the alkyl has from 1 to 12 carbon atoms, as diisopropylperoxydicarbonate (IPP), di-sec-butylperoxydicarbonate, di-sec-hexylperoxy dicarbonate, di-n-propylperoxydicarbonate, and di-n-butyl peroxydicarbonate;
III) peroxyesters, having from 3 to 20 carbon atoms, as ter-butylperoxyisobutyrate and ter-butylperoxypivalate;
IV) diacylperoxides, wherein the acyl has from 2 to 12 carbon atoms, as diacetylperoxide and dipropionylperoxide; di(perfluoroacyl)peroxides, or di(chlorofluoroacyl)peroxides, as di(perfluoropropionyl)peroxide and di(tri-chloroocta fluorohexanoyl)peroxide.

The use of peroxides of the groups I) and II) is preferred, and for each of these two classes, respectively, the use of DTBP and of IPP is more preferred.

The process for the preparation of the invention fluoroelastomers can be carried out, for example, by copolyemrization of the corresponding monomers in aqueous emulsion in the presence of a radical initiator, preferably an organic peroxide as above defined. The emulsion polymerization can be carried out according to known methods as, for example, those described in Kirk Othmer, Encyclopaedia of Chemical Technology, vol. 8, pages 500 and on, 1979. The process temperature is between 100° and 150° C., preferably between 105° and 130° C. One can operate at pressures between 10 and 100 bar, preferably between 20 and 50 bar. As known, the emulsion polymerization requires also the presence of surfactants. The at least partially fluorinated surfactants are particularly preferred, corresponding to the general formula:

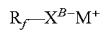

wherein $R_f$ is a $C_5$-$C_{16}$ (per)fluoroalkyl chain or a (per)fluoropolyoxyalkylene chain, $X^{B-}$ is —COO⁻ or —SO$_3^-$, $M^+$ is selected between: $H^+$, $NH_4^+$, an alkaline metal ion. Among the most commonly used we remember: ammonium perfluoro-octanoate, (per)fluoropolyoxyalkylenes ended with one or more carboxyl groups, optionally salified with sodium, ammonium and alkaline metals in general, preferably sodium, partially fluorinated alkylsulphonates. See for example patent U.S. Pat. No. 4,524,197. To the reaction mixture chain transfer agents can be added, selected from those commonly used in the fluoroelastomer synthesis. It can be mentioned: hydrogen, hydrocarbons having from 1 to 12 carbon atoms, for example methane, ethane, methylcyclopentane; chloro(fluoro)carbons having from 1 to 10 carbon atoms, optionally containing hydrogen, for example chloroform, trichlorofluoromethane; esters, alcohols, ethers having from 1 to 12 carbon atoms, for example ethylacetate, diethylmalonate, diethylether, isopropanol, and the like. Other chain transfer agents are, for example, the following:

iodinated and/or brominated chain transfer agents, as, for example, the compounds of general formula $Rf_b(I)_{xB}(Br)_y$ ($Rf_b$=perfluorinated hydrocarbon radical containing from 1 to 8 carbon atoms, xB, y=integers between 0 and 2, with at least xB or y=1 and xB+y≦2);

alkaline or alkaline-earth metal iodides and/or bromides, according to what described in the European patent application EP 407,937.

When the emulsion polymerization is completed, the fluoroelastomer is isolated from the polymeric latex with known methods, as the coagulation by addition of electrolytes or by cooling.

The preparation of the fluoroelastomers object of the present invention can advantageously be carried out in aqueous emulsion in the presence of perfluoropolyoxyalkylene microemulsions, according to patent U.S. Pat. No. 4,864,006, or also of fluoropolyoxyalkylene microemulsions having hydrogenated end groups and/or hydrogenated repeating units, according to EP 625,526.

The last process is preferred (see the Examples).

The polymerization can advantageously be carried out also using, instead of a microemulsion, an emulsion or a dispersion of perfluoropolyoxyalkylenes and water according to the method described in the patent U.S. Pat. No. 4,789,717. To this purpose also the emulsions and dispersions of perfluorooxyalkylenes and water described for example in the patent applications EP 196,904, EP 280,312 and EP 360,292 can be used.

An example of another method usable to prepare the fluoroelastomers of the present invention is the suspension polymerization as described in the patent U.S. Pat. No. 6,277,937.

The compositions object of the present invention are ionically cured, as it is well known in the prior art.

As said, the cured fluoroelastomers of the present inventions can be used also as O-rings, gaskets, shaft seals, hoses, profiles, etc. and are suitable also for gaskets with metal insertions, generally used for big size pieces for applications in the automotive and chemical industry.

The fluoroelastomers of the present invention, after curing in press at high temperature, generally between 170° C. and 230° C., show compression set values lower than 20%. Further improved compression set values, lower than 12%, are obtained by subjecting the fluoroelastomer to short post-treatment times, generally less than 1 hour. The compression set values obtained after said short post-treatment times remain substantially unchanged in comparison with those of conventional post-treatments, of the order of 24 hours at 250° C.

It has been surprisingly found that the cured fluoroelastomers of the present invention do not show defects on the manufactured article and therefore they allow the reduction of wastes during the processability step in comparison with the cured fluoroelastomers of the prior art.

The present invention will now be better illustrated by the following Examples which have a merely indicative but not limitative purpose for the scope of the invention itself.

EXAMPLES

Determination of the Polar End Groups

The determination is carried out by FT-IR, $^1$H-NMR (300 MHz) and $^{19}$F-NMR (188 MHz) analyses. The method is described in M. Pianca, J. Fluorine Chem. 95 (1999) 71-84.

Polar end groups are, for example, the following: —CH$_2$OH, carboxyl, COF, —CONH$_2$, —OSO$^{3-}$.

Method sensitivity limit: 0.1 mmoles/Kg. Under the detectability limit it is considered that the ionic end groups are absent.

Methods for the Characterization of the Invention Fluoroelastomeric Composition

Viscosity

The Mooney viscosity ML (1+10) at 121° C. and the Mooney scorch MS at 135° C. have been determined according to ASTM D 1646.

Scorch Time

The scorch time reported in the Tables t15 corresponds to the necessary time to reach a Mooney viscosity equal to the minimum viscosity MV+15 Mooney points.

The characteristics of the crosslinking process have been determined according to the ASTM D 5289 method, using a MDR (Moving Die Rheometer) 2000E Alpha Tecnologies Ltd.

The following test conditions have been used:
oscillation frequency: 1.66 MHz;
oscillation width: +/−0.5 degrees;
temperature: 200° C. or −170° C. (see the Tables);
specimen weight: 7-8 g;
test duration: sufficient to reach the plateau.
The following parameters have been recorded:
ML: minimum torque level, expressed in lbf.in units;
MHF: maximum torque level at plateau, in lbf.in units;
ts2: necessary time to reach a torque equal to ML+2 lbf.in;
t'x: necessary time to reach a torque equal to ML+x(MHF-ML)/100, with x=50, 90, 95.

Determination of the Sealing and Mechanical Properties

The compression set has been determined on O-ring 214, according to the ASTM D 1414 method.

O-ring 214 have been cured in press at 190° C. for a time qual to t'95 of the MDR curve. On the cured O-rings the compression set after press has been determined. It has been measured also the compression set after post-cure on the O-rings cured in press and post-treated in an air-ventilated stove at 250° C. for the time specified in the Examples.

The tensile properties have been measured on specimens punched by the plates, according to the ASTM D 412 standard, method C. The Shore A hardness (3") has been measured on 3 plate pieces piled according to the ASTM D 2240 method.

13×13×2 mm plates have been cured in press at 190° C. for 8 minutes. On the cured plates the tensile properties and the hardness after press have been measured. The same properties have been measured after post-cure on the plates cured in press and post-treated in an air-ventilated stove at 250° C. for the time specified in the Examples.

Preparation of the Microemulsion

In a glass reactor equipped with stirrer, under slow stirring, the following components are fed as follows, for the preparation of 1 kg of microemulsion. The correspondence by volume is equal to 782 ml.

1) 170 ml of acid having a number-average molecular weight 600 are fed in the reactor and having formula:

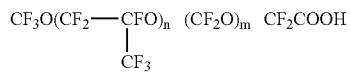

wherein n/m=10;

2) 170 ml of an aqueous emulsion of ammonium hydroxide at 30% by volume are added;
3) 340 ml of demineralized water are added;
4) 102 ml of Galden® D02 are added of formula:

wherein n/m=20 and having average molecular weight of 450.

Example 1

Preparation of a VDF/HFP Copolymer According to the Present Invention and Preparation of the Respective Formulations Without Component e)

15 l of water and 150 g of the microemulsion prepared according to the described procedure are introduced in a 21 l horizontal reactor equipped with stirrer working at 50 rpm.

The reactor is heated up to 122° C. and then brought to the pressure of 35 relative bar by monomer feeding until having the following top composition: VDF=53% by moles HFP=47% by moles.

After feeding of 12 g of diterbutylperoxide (DTBP) the reaction starts and the pressure is maintained constant for the whole duration of the polymerization by feeding a mixture formed of:

VDF=78.5% by moles,

HFP=21.5% by moles.

After a prefixed amount of reacted monomeric mixture corresponding to 4500 g, the reaction is stopped. The total polymerization time is equal to 265 minutes.

The latex resulting to have a concentration of 271 g/l latex is then coagulated with the use of an electrolyte agent (aluminum sulphate), washed and dried at 80° C. for 24 h.

The obtained polymer has a Mooney viscosity ML (1+10 at 121° C.) equal to 44.

The $^{19}$F NMR analysis shows the following composition: 79.3% molar of HFP, 20.7% molar of VDF.

The analyses of the end groups carried out by FT-IR, $^1$H-NMR, $^{19}$F-NMR have shown the presence of $CF_2H$ and $CH_3$ end groups and the total absence of polar end groups (<0.1 mmoles/Kg), as $CH_2OH$, carbonyls and carboxyls.

The fluoroelastomer has been formulated as described in Table 1. Tecnoflon FOR XA51 (adduct b)+c)) is the adduct 1,1,-diphenyl-1-benzyl-N-diethylphosphoramine/bisphenol AF in the 1/5 ratio.

In the formulation 0.13 phr of componente b) and in total 2.37 phr of component c) are present.

The rheometric and mechanical properties data are reported in the same Table. As it can be noticed, the compression set value after press is very good, and the crosslinking time (t'$_{90}$) is good.

Example 2 (Comparative)

Preparation of a Formulation as in the Example 1 of a Copolymer Blend with 0.15 Moles/Kg of Ionic End Groups A blend of copolymer Tecnoflon®N535 40 parts/copolymer Tecnoflon®N935 60 parts is used. The ionic end groups have been determined in the blend by using the above method.

The fluoroelastomer has been formulated as described in the Example 1 (see Table 1). The rheometric and mechanical properties data are reported in the same Table.

It is found that the compression set value is not determinable since the required curing times do not allow to obtain a final manufactured article.

Example 3

Preparation of a Formulation of the Copolymer of the Example 1 Wherein 1 phr of Component e) is Used The fluoroelastomer has been formulated as described in Table 1. The rheometric and mechanical properties data are reported in the same Table. As it can be noticed, the compression set value after press and the crosslinking time are very good.

Example 4 (Comparative)

Preparation of a Formulation Containing the Blend Used in the Example 2 Comp Wherein 1 phr of Component e) is Used as in the Example 3

The fluoroelastomer has been formulated as described in Table 1. The rheometric and mechanical properties data are reported in the same Table.

As it can be noticed, the compression set values (after press and after post cure at 250° C.) are higher than those of Example 3. Furthermore the crosslinking time is very high, technologically not acceptable.

Example 5

Preparation of a Formulation of the Copolymer of the Example 1 Wherein 1 phr of Component e) and 0.5 phr of Component g) are Used The fluoroelastomer has been formulated as described in Table 1. The rheometric and mechanical properties data are reported in the same Table. From Table 1 it is noticed that the compression set value after press is good and the crosslinking time is very reduced.

Example 6 (Comparative)

Preparation of a Formulation Containing the Blend of the Example 2 Comp Wherein 0.5 phr of Component g) are Used The fluoroelastomer has been formulated as described in Table 1. The rheometric and mechanical properties data are reported in the same Table.

As it can be noticed, the compression set values (after press and after post cure at 250° C.) are worse than those of the formulation of the Example 5. Furthermore the crosslinking time is much longer and technologically not acceptable.

Example 7

Preparation of a Formulation of the Copolymer of the Example 1 Containing 7 phr of Component d)

The fluoroelastomer has been formulated as described in Table 2. The rheometric and mechanical properties data are reported in the same Table.

As it can be noticed from the Table, compression set values are very good and the crosslinking time is technologically acceptable.

Example 7a (Comparative)

Preparation of a Formulation of the Copolymer of the Example 1 Wherein 0.42 phr of Component b) are Used The fluoroelastomer has been formulated as reported in Table 2. In the same Table also the rheometric and mechanical properties are reported.

As it can be noticed, the compression set values after press and after post-cure are worse than those obtained with the formulation of the Example 7.

Example 8

Preparation of a Formulation as in the Example 7 but Containing Also 0.5 phr of Component g)

The fluoroelastomer of the Example 1 has been formulated as reported in Table 2.

The rheometric and mechanical properties are reported in the same Table.

As it can be noticed, the compression set value already after press and the crosslinking time are good.

Example 9

Preparation of a Formulation of the Copolymer of the Example 1 Wherein 2 phr of Component e) are Used The fluoroelastomer has been formulated as reported in Table 3.

The rheometric and mechanical properties are reported in the same Table. As it can be noticed, the compression set value after press is good and the crosslinking time is very good. The tensile properties and the hardness, after press and after post-cure, are rather similar and anyway the same properties already after press are very good.

Example 10

Preparation of a Formulation of the Copolymer of the Example 1 Wherein 2 phr of Component e) and 0.5 phr of Component g) are Used The fluoroelastomer has been formulated as reported in Table 3.

The rheometric and mechanical properties are reported in the same Table. As it can be noticed, the crosslinking time is remarkably reduced and the compression set value after press is still acceptable (<20%).

The tensile properties and the hardness, after press and after post-cure, are rather similar and anyway the same properties already after press are very good.

Example 11

Preparation of a Formulation of the Copolymer of the Example 1

In the formulation 0.116 phr of component b) and 2.18 phr of component c) are present.

The rheometric and mechanical properties are reported in Table 4. As it can be noticed from the Table the compression set values are excellent and the crosslinking rate value is very good.

Example 12

Preparation of a Formulation of the Copolymer of the Example 1 Wherein the Same Amounts of Components b) and c) of the Example 11 and 0.5 phr of Component g) are Used The fluoroelastomer has been formulated as reported in Table 4. The rheometric and mechanical properties are reported in the same Table. As it can be noticed, the compression set value after press is good and the crosslinking time is very good.

Examples 13-15

Preparation of Formulations of the Copolymer of the Example 1 Wherein Components e) and g) are not Present and an Amount of Component d) of 3, 6 and 9 phr, Respectively, is Used The fluoroelastomer has been formulated as reported in Table 5. The rheometric and mechanical properties are reported in the same Table.

TABLE 1

| | Examples (amount in phr) | | | | | |
|---|---|---|---|---|---|---|
| | 1 | 2 comp | 3 | 4 comp | 5 | 6 comp |
| Polymer Ex. 1 | 100 | — | 100 | — | 100 | — |
| Polymer Ex. 2 comp | — | 100 | — | 100 | — | 100 |
| b) + c) XA51 | 0.8 | 0.8 | 0.8 | 0.8 | 0.8 | 0.8 |
| c) Bisphenol AF | 1.70 | 1.70 | 1.70 | 1.70 | 1.7 | 1.7 |

TABLE 1-continued

| | Examples (amount in phr) | | | | | |
|---|---|---|---|---|---|---|
| | 1 | 2 comp | 3 | 4 comp | 5 | 6 comp |
| d) MgO | 4 | 4 | 3 | 3 | 3 | 3 |
| e) Ca(OH)$_2$ | — | — | 1 | 1 | 1 | 1 |
| f) MT N990 | 30 | 30 | 30 | 30 | 30 | 30 |
| g) sulpholane | — | — | — | — | 0.5 | 0.5 |
| MDR at 200° C., arc 0.5° | | | | | | |
| ML lbf·in | 1.08 | 0.93 | 1.07 | 0.96 | 1.00 | 0.98 |
| MH lbf·in | 21.3 | 24.0 | 21.9 | 24.9 | 21.1 | 25.00 |
| ts2 min | 2.84 | 15.73 | 2.05 | 9.69 | 1.80 | 9.01 |
| t'50 min | 5.47 | 29.80 | 3.64 | 16.90 | 3.08 | 14.30 |
| t'90 min | 8.88 | 52.60 | 5.83 | 27.37 | 4.45 | 24.30 |
| Compression set O-R 200° C. 70 h | | | | | | |
| After press % | 15 | n.d. | 17 | 22 | 18 | 24 |
| p.c. 250° C. 0.5 h % | 10 | | 11 | 16 | 12 | 17 |

TABLE 2

| | Examples (amount in phr) | | |
|---|---|---|---|
| | 7 | 7a comp | 8 |
| Polymer Ex. 1 | 100 | 100 | 100 |
| b) + c) XA51 | 0.8* | 2.5** | 0.8 |
| c) Bisphenol AF | 1.70 | — | 1.70 |
| d) MgO | 7 | 7 | 7 |
| e) Ca(OH)$_2$ | — | — | — |
| f) MT N990 | 30 | 30 | 30 |
| h) Sulpholan | — | — | 0.5 |
| MDR arc 0.5° | 200° C. | 170° C. | 200° C. |
| ML lbf·in | 1.48 | 1.46 | 1.39 |
| MH lbf·in | 20.35 | 20.1 | 20.34 |
| ts2 min | 3.58 | 1.7 | 2.38 |
| t'50 min | 8.20 | 2.34 | 4.72 |
| t'90 min | 15.87 | 3.3 | 8.62 |
| Compression set O—R 200° C. 70 h | | | |
| after press % | 15 | 33 | 18 |
| p.c. 250° C. 0.5 h % | 10 | 17 | 12 |

*component b) 0.13 phr; component c) 0.67 phr;
**component b) 0.42 phr; component c) 2.08 phr;

TABLE 3

| | Examples (amount in phr) | |
|---|---|---|
| | 9 | 10 |
| Polymer Ex. 1 | 100 | 100 |
| b) + C) XA51 | 0.8 | 0.8 |
| C) Bisphenol AF | 1.70 | 1.70 |
| d) MgO | 3 | 3 |
| e) Ca(OH)$_2$ | 2 | 2 |
| f) MT N990 | 30 | 30 |
| g) Sulpholan | — | 0.5 |
| MDR at 200° C., arc 0.5° | | |
| ML lbf·in | 0.8 | 0.9 |
| MH lbf·in | 19.7 | 20.2 |

TABLE 3-continued

| | Examples (amount in phr) | |
|---|---|---|
| | 9 | 10 |
| ts2 min | 1.32 | 1.50 |
| t'50 min | 3.08 | 2.28 |
| t'90 min | 4.83 | 3.50 |
| Compression set O—R 200° C. 70 h | | |
| After press % | 18 | 19 |
| p.c. 250° C. 0.5 h % | 10 | 12 |
| Mechanical properties after press | | |
| M100 Mpa | 5.0 | 6.5 |
| C.R. (T.S.) Mpa | 14.2 | 14.8 |
| A.R. (E.B.) % | 212 | 198 |
| Hardness (HDS) ShA | 68 | 69 |
| Mechanical properties after post cure (0.5 h at 250° C.) | | |
| M100 Mpa | 5.6 | 7.2 |
| C.R. (T.S.) Mpa | 16.9 | 17.8 |
| A.R. (E.B.) % | 195 | 176 |
| Hardness (HDS) ShA | 69 | 70 |

TABLE 4

| | Examples (amount in phr) | |
|---|---|---|
| | 11 | 12 |
| Polymer Ex. 1 | 100 | 100 |
| b) + c) XA51 | 0.7 | 0.7 |
| c) Bisphenol AF | 1.6 | 1.6 |
| d) MgO | 3 | 3 |
| e) Ca(OH)$_2$ | 2 | 2 |
| f) MT N990 | 30 | 30 |
| g) Sulpholan | — | 0.5 |
| MDR at 200° C., arc 0.5° | | |
| ML lbf·in | 1.11 | 0.97 |
| MH lbf·in | 20.53 | 19.65 |
| ts2 min | 2.28 | 1.92 |
| t'50 min | 3.67 | 3.08 |
| t'90 min | 5.68 | 4.80 |
| Compression set O—R 200° C. 70 h | | |
| After press % | 15 | 18 |
| p.c. 250° C. 0.5 h % | 10 | 12 |

TABLE 5

| | Examples (amount in phr) | | |
|---|---|---|---|
| | 13 | 14 | 15 |
| Polymer Ex. 1 | 100 | 100 | 100 |
| b) + c) XA51 | 0.8 | 0.8 | 0.8 |
| c) Bisphenol AF | 1.7 | 1.7 | 1.7 |
| d) MgO | 3 | 6 | 9 |
| f) MT N990 | 30 | 30 | 30 |
| MDR at 200° C., arc 0.5° | | | |
| ML lbf.in | 0.43 | 0.52 | 0.60 |
| MH lbf.in | 21.5 | 20.9 | 18.9 |
| ts2 min | 2.93 | 2.85 | 3.20 |

TABLE 5-continued

|  | Examples (amount in phr) | | |
| --- | --- | --- | --- |
|  | 13 | 14 | 15 |
| t'50 min | 5.18 | 5.09 | 7.21 |
| t'90 min | 8.40 | 8.70 | 15.44 |
| Compression set O—R 200° C. 70 h | | | |
| After press % | 15 | 15 | 17 |
| p.c. 250° C. 0.5 h % | 9 | 10 | 11 |

The invention claimed is:

1. Ionically curable fluoroelastomers based on vinylidenefluoride (VDF) comprising:
   a) 100 parts by weight of fluoroelastomer based on vinylidenefluoride (VDF) substantially polar end groups free, wherein the amount of polar end groups is lower than the detectability limit of the determination method based on FT-IR, $^1$H-NMR (300 MHz) and $^{19}$F-NMR (188 MHz) analysis, wherein said detectability limit is 0.1 mmol/kg;
   b) from 0.1 to 0.15 phr of accelerating agent;
   c) from 1 to 15 phr of curing agent;
   d) from 2 to 20 phr of one or more inorganic acid acceptors;
   e) from 0 to 3 phr of one or more basic compounds;
   f) from 0 to 80 phr of reinforcing fillers; and
   g) from 0 to 3 phr of coadjuvants of processability,
   wherein when the ionically curable fluoroelastomers are used in O-rings, the ionically curable fluoroelastomers have compression set values lower than 20% after crosslinking in press at 190° C.-200° C. for 5-10 minutes and compression set values lower than 12% with post-treatment times at 250° C. lower than 30 minutes.

2. Curable fluoroelastomers according to claim 1, wherein the fluoroelastomers component a) comprise VDF copolymers containing at least another ethylenically unsaturated fluorinated comonomer selected from the following:
   $C_2$-$C_8$ perfluoroolefins, as hexafluoropropene (HFP), tetrafluoroethylene (TFE);
   $C_2$-$C_8$ fluoroolefins containing hydrogen and/or chlorine and/or bromine and/or iodine, as trifluoroethylene, pentafluoropropene, chlorotrifluoroethylene (CTFE), bromotrifluoroethylene;
   fluorovinylethers (VE) preferably selected from:
      $CF_2$=$CFOR_f$ (per)fluoroalkylvinylethers (PAVE), wherein $R_f$ is a $C_1$-$C_6$ (per)fluoroalkyl;
      $CF_2$=CFOX perfluoro-oxyalkylvinylethers, wherein X is a $C_1$-$C_{12}$ perfluoro-oxyalkyl having one or more ether groups; or
      $CF_2$=$CFOCF_2OCF_2CF_3$ (A-III) and $CF_2$=$CFOCF_2OCF_2CF_2OCF_3$ (A-IV).

3. Curable fluoroelastomers according to claim 1, wherein component a) contains $C_2$-$C_8$ non fluorinated olefins (OI).

4. Curable fluoroelastomers according to claim 1, wherein component a) contains an amount from 0.01 to 5% by moles of units deriving from a fluorinated bis-olefin having formula

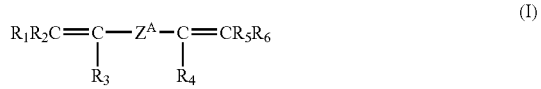
(I)

wherein:
$R_1, R_2, R_3, R_4, R_5, R_6$, equal to or different from each other, are H or $C_1$-$C_5$ alkyls; $Z^A$ is a $C_1$-$C_{18}$, linear or branched alkylene or cycloalkylene radical, optionally containing oxygen atoms or a (per)fluoropolyoxyalkylene radical.

5. Curable fluoroelastomers according to claim 1, wherein component a) has the following composition as % by moles:
   VDF 45-85%, HEP 15-45%, TEE 0-30%;
   VDF 20-30%, HFP 15-40%, TFE 0-30%, OI 5-30, VE 0-35%; or
   VDF 60-75%, HFP 10-25%, VE 0-15%, TEE 0-20%.

6. Curable fluoroelastomers according to claim 1, wherein component b) is an -onium organic derivative.

7. Curable fluoroelastomers according to claim 6, wherein the -onium organic compounds contain one heteroatom selected from N, P, S, O linked to organic or inorganic groups.

8. Curable fluoroelastomers according to claim 6, wherein component b) is selected between quaternary ammonium or phosphonium salts or amino-phosphonium salts.

9. Curable fluoroelastomers according to claim 8, wherein component b) is selected from the following: triphenyl benzylphosphonium chloride, tetraphenylphosphonium chloride, tetrabutylammonium chloride, tetrabutylammonium bisulphate, tetrabutylammonium bromide, tributylallylphosphonium chloride, tributylbenzylphosphonium chloride, dibutyl-diphenylphosphonium chloride, tetrabutylphosphonium chloride, triarylsulphonium chloride, benzyldiphenyl (diethylamino) phosphonium and benzyltris (dimethylamino) phosphonium salts.

10. Curable fluoroelastomers according to claim 1, wherein component c) is selected from polyhydroxylated, aromatic or aliphatic compounds, or their derivatives.

11. Curable fluoroelastomers according to claim 10, wherein component c) is selected from bis-phenols.

12. Curable fluoroelastomers according to claim 11, wherein component c) is the bisphenol AF hexafluoro isopropylidene bis(4-hydroxybenzene).

13. Curable fluoroelastomers according to claim 6, wherein instead of component b) and c) an adduct of component b) with component c) is used.

14. Curable fluoroelastomers according to claim 13, wherein the molar ratios curing agent: accelerating agent range from 1:1 to 5:1.

15. Curable fluoroelastomers according to claim 13, wherein when the adduct is used in the presence of component b), free accelerating agent is present in addition to that contained in the adduct.

16. Curable fluoroelastomers according to claim 13, wherein when the adduct is used in the presence of component c), free curing agent is present in addition to that contained in the adduct.

17. Curable fluoroelastomers according to claim 13, wherein the adduct contains cations selected from the following: 1,1-diphenyl-1-benzyl-N-diethyl-phosphoranamine, tetrabutyl phosphonium, or tetrabutyl ammonium, and anions selected from compounds of bisphenol wherein the two aromatic rings are linked by an alkylene group selected from perfluoroalkylene groups from 3 to 7 carbon atoms, and the hydroxyls in the aromatic rings are in para position.

18. Curable fluoroelastomers according to claim 17, wherein the adduct contains cations selected from the following: 1,1-diphenyl-1-benzyl-N-diethyl-phosphoranamine, tetrabutyl phosphonium, or tetrabutyl ammonium, and the anion is the bisphenol AF.

19. Curable fluoroelastomers according to claim 1, wherein component d) inorganic acid acceptor is selected from ZnO, MgO, and PbO.

20. Curable fluoroelastomers according to claim 1, wherein component e) basic compound is selected from Ca(OH)$_2$, Sr(OH)$_2$, Ba(OH)$_2$, Ca, Sr, Ba, Na and K carbonates, benzoates, oxalates and phosphites.

21. Curable fluoroelastomers according to claim 1, wherein component f) is selected from carbon black, barium sulphate, silica, silicates, or semicrystalline fluoropolymers.

22. Curable fluoroelastomers according to claim 21, wherein the semicrystalline fluoropolymer has sizes from 5 to 90 nm, preferably from 10 to 60 nm.

23. Curable fluoroelastomers according to claim 1, wherein the coadjuvants of processability are selected from esters and amides of fat acids, long chain aliphatic alcohols, sterearic acid and its inorganic salts, or substituted sulphur diorgano oxides.

24. Curable fluoroelastomers according to claim 23, wherein as coadjuvants of processability substituted sulphur diorgano oxides are used.

25. Curable fluoroelastomers according to claim 1, comprising thickening additives, pigments, antioxidants, or stabilizers.

26. Cured fluoroelastomers according to claim 1.

27. Fluoroelastomers according to claim 26 which are ionically cured.

28. Manufactured articles obtained with the cured fluoroelastomers of claim 26.

29. Manufactured articles according to claim 28 selected from O-rings, gaskets, shaft seals, or hoses.

30. Ionically curable fluoroelastomers according to claim 1 comprising:
b) from 0.1 to 0.3 of accelerating agent;
c) from 1 to 10 phr of curing agent;
d) from 2 to 10 phr of one or more inorganic acid acceptors;
e) from 0 to 2 phr of one or more basic compounds;
f) from 20 to 60 phr of reinforcing fillers;
g) from 0 to 2 phr of coadjuvants of processability.

31. Ionically curable fluoroelastomers according to claim 30 comprising:
d) from 3 to 7 phr of one or more inorganic acid acceptors;
e) from 0.5 to 1 ph of one or more basic compound
g) from 0.5 to 1 phr of coadjuvants of processability.

32. Ionically curable fluoroelastomers according to claim 1, wherein the one or more inorganic acid acceptors are bivalent metal oxides.

33. Ionically curable fluoroelastomers according to claim 1, wherein the one or more basic compounds are hydroxides of bivalent metals or of weak acid metal salts.

34. Ionically curable fluoroelastomers according to claim 2, wherein the CF$_2$=CFOX perfluoro-oxyalkylvinylethers is perfluoro-2-propoxypropyl.

35. Ionically curable fluoroelastomers according to claim 4, wherein $Z^A$ is at least partially fluorinated.

36. Curable fluoroelastomers according to claim 14, wherein the molar ratios curing agent:accelerating agent range from 2:1 to 5:1.

37. Curable fluoroelastomers according to claim 24, wherein the substituted sulphur diorgano oxides are sulphones and sulpholanes.

* * * * *